(12) United States Patent
Samsonov et al.

(10) Patent No.: US 9,934,412 B2
(45) Date of Patent: Apr. 3, 2018

(54) IMPLEMENTING REPLAY PROTECTED STORAGE

(71) Applicant: Microsoft Technology Licensing, LLC, Redmond, WA (US)

(72) Inventors: Yevgeniy A. Samsonov, Bellevue, WA (US); Kinshuman Kinshumann, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 40 days.

(21) Appl. No.: 14/748,214

(22) Filed: Jun. 23, 2015

(65) Prior Publication Data

US 2016/0379015 A1 Dec. 29, 2016

(51) Int. Cl.
*G06F 12/14* (2006.01)
*G06F 21/78* (2013.01)
*G06F 21/62* (2013.01)
*G06F 21/64* (2013.01)

(52) U.S. Cl.
CPC .......... *G06F 21/78* (2013.01); *G06F 21/6209* (2013.01); *G06F 21/64* (2013.01)

(58) Field of Classification Search
CPC ....... G06F 21/64; G06F 21/78; G06F 21/6209
See application file for complete search history.

(56) References Cited

U.S. PATENT DOCUMENTS

| | | | |
|---|---|---|---|
| 7,681,050 B2 * | 3/2010 | Blom | G06F 21/64 713/161 |
| 7,681,240 B2 | 3/2010 | Maheshwari et al. | |
| 8,108,641 B2 * | 1/2012 | Goss | G06F 12/1408 711/163 |
| 8,429,423 B1 * | 4/2013 | King | G06F 11/302 713/193 |
| 8,458,480 B2 | 6/2013 | Iliev et al. | |
| 2006/0161773 A1 | 7/2006 | Okazaki et al. | |
| 2007/0073416 A1 | 3/2007 | Grawrock | |

(Continued)

FOREIGN PATENT DOCUMENTS

| | | |
|---|---|---|
| CN | 101183413 A | 5/2008 |
| WO | 2014035650 A1 | 3/2014 |
| WO | 2014044623 A1 | 3/2014 |

OTHER PUBLICATIONS

Aaraj, et al., "Analysis and Design of a Hardware/Software Trusted Platform Module for Embedded Systems", In Journal of ACM Transactions on Embedded Computing Systems, vol. 8, Issue 1, Dec. 2008, 31 pages.

(Continued)

*Primary Examiner* — Khoi Le

(74) *Attorney, Agent, or Firm* — Arent Fox LLP

(57) ABSTRACT

In one embodiment, a data storage client may establish a virtual replay protected storage system with an agnostic data storage. The virtual replay protected storage system may maintain a trusted counter and a secret key in a trusted client environment. The virtual replay protected storage system may encode a hash message authentication code signature based on the trusted counter, the secret key, and a data set. The virtual replay protected storage system may send a write request of the data set with the hash message authentication code signature to an agnostic data storage.

13 Claims, 11 Drawing Sheets

(56) References Cited

U.S. PATENT DOCUMENTS

| | | | |
|---|---|---|---|
| 2012/0151223 A1* | 6/2012 | Conde Marques | ... G06F 21/575 |
| | | | 713/193 |
| 2013/0081144 A1* | 3/2013 | Kambayashi | ......... H04L 9/0869 |
| | | | 726/27 |
| 2013/0346757 A1 | 12/2013 | Nick et al. | |
| 2014/0006805 A1 | 1/2014 | Colp et al. | |
| 2014/0223198 A1* | 8/2014 | Saranghar | ............... G06F 13/14 |
| | | | 713/193 |
| 2015/0006789 A1 | 1/2015 | Buer | |

OTHER PUBLICATIONS

"International Search Report and Written Opinion Issued in PCT Application No. PCT/US2016/038449", dated Oct. 7, 2016, 10 Pages.

"Second Written Opinion Issued in PCT Application No. PCT/US2016/038449", dated May 29, 2017, 6 Pages.

"International Preliminary Report on Patentability Issued in PCT Application No. PCT/US2016/038449", dated Sep. 19, 2017, 7 Pages.

* cited by examiner

US 9,934,412 B2

IMPLEMENTING REPLAY PROTECTED STORAGE

BACKGROUND

A computing device may store a data set within the secure confines of the computing device. The computing device may have an insecure connection between the client application storing the data and the data storage device of the computing device. Further, the computing device may be storing data in a storage device separated from the computing device by a local network or over the internet. The storage device may implement numerous security protocols to protect the data stored by the computing device.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to a virtual replay protected storage system with an agnostic data storage. The virtual replay protected storage system may maintain a trusted counter and a secret key in a trusted client environment. The virtual replay protected storage system may encode a hash message authentication code signature based on the trusted counter, the secret key, and a data set. The virtual replay protected storage system may send a write request of the data set associated with the hash message authentication code signature to an agnostic data storage.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a virtual replay protected storage system, a computing device, or a machine-implemented method.

In one embodiment, a data storage client may establish a virtual replay protected storage system with an agnostic data storage. The virtual replay protected storage system may maintain a trusted counter and a secret key in a trusted client environment. The virtual replay protected storage system may encode a hash message authentication code signature based on the trusted counter, the secret key, and a data set. The virtual replay protected storage system may send a write request of the data set associated with the hash message authentication code signature to an agnostic data storage. The virtual replay protected storage system may send a read request for the data set with the hash message authentication code signature from the agnostic data storage. The virtual replay protected storage system may verify the hash message authentication code signature to determine whether the data set has been corrupted.

Figure 1:
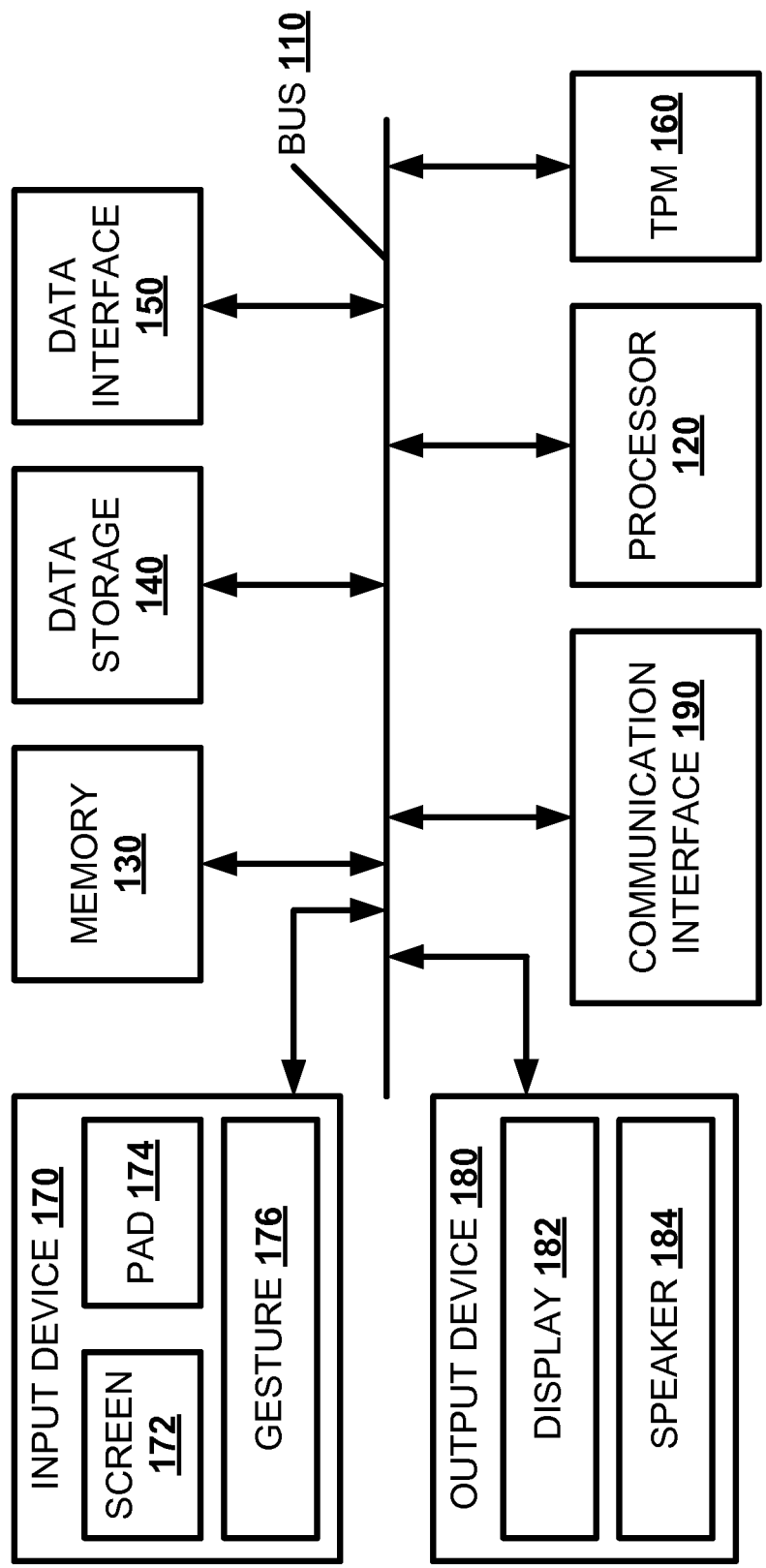
FIG. 1 illustrates, in a block diagram, one embodiment of a computing device.

FIG. 1 illustrates a block diagram of an exemplary computing device 100 which may act as a virtual replay protected storage system. The computing device 100 may combine one or more of hardware, software, firmware, and system-on-a-chip technology to implement a virtual replay protected storage system. The computing device 100 may include a bus 110, a processing core 120, memory 130, a data storage 140, a data interface 150, a trusted platform module (TPM) 160, an input device 170, an output device 180, and a communication interface 190. The bus 110, or other component interconnection, may permit communication among the components of the computing device 100.

The processing core 120 may include at least one conventional processor or microprocessor that interprets and executes a set of instructions. At least one processor of the processing core 120 is configured to encode a hash message authentication code signature based on the trusted counter, a secret key stored in the trusted client environment, and a data set. At least one processor of the processing core 120 is further configured to verify the hash message authentication code signature to determine whether the data set has been corrupted. At least one processor of the processing core 120 is also configured to create a root hash in a primary header instance of the data set based on a sector hash message authentication code signature of a data sector of the data set. At least one processor of the processing core 120 is additionally configured to create the hash message authentication code signature from the root hash of a data sector of the data set and the trusted counter. At least one processor of the processing core 120 is further configured to allocate a spare sector in the agnostic data storage for a data sector of the data set.

The memory 130 may be a random access memory (RAM) or another type of dynamic data storage that stores information and instructions for execution by the processor 120. The memory 130 may also store temporary variables or other intermediate information used during execution of instructions by the processor 120. The memory 130 is configured to associate a sector hash message authentication code signature with a data sector of the data set in a primary header instance. The memory 130 is further configured to associate a physical sector address with a sector hash message authentication code signature of a data sector of the data set. The memory 130 is also configured to maintain a check digest for the data set, such as a 32-bit cyclic redundancy check digest, in a primary header instance. The memory 130 is additionally configured to maintain a spare sector list describing a spare sector in a primary header instance. The memory 130 is further configured to associate a successor header instance with the data set having a successor hash message authentication code signature based on an incremented trusted counter value.

The data storage 140 may include a conventional ROM device or another type of static data storage that stores static information and instructions for the processor 120. The data storage 140 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 140 may store a set of instructions detailing a method that when executed by one or more processors cause the one or more processors to perform the method.

The data interface 150 may connect the virtual replay protected storage system to an agnostic data storage. An agnostic data storage may comply with a replay protected storage protocol or not without affecting the efficacy of the virtual replay protected storage system. The data interface 150 may be configured to send a write request of the data set associated with the hash message authentication code signature to the agnostic data storage. The data interface 150 may be configured to send a read request of the data set associated with the hash message authentication code signature to the agnostic data storage. The trusted platform module 160 may be configured to act as a trusted client environment for maintaining a trusted counter and a secret key. The trusted counter may be configured to increment upon selection of a successor header instance for the data set.

The input device 170 may include one or more conventional mechanisms that permit a user to input information to the computing device 100, such as a keyboard, a mouse, a voice recognition device, a microphone, a headset, a touch screen 172, a touch pad 174, a gesture recognition device 176, etc. The output device 180 may include one or more conventional mechanisms that output information to the user, including a display screen 182, a printer, one or more speakers 184, a headset, a vibrator, or a medium, such as a memory, or a magnetic or optical disk and a corresponding disk drive. The communication interface 190 may include any transceiver-like mechanism that enables computing device 100 to communicate with other devices or networks. The communication interface 190 may include a network interface or a transceiver interface. The communication interface 190 may be a wireless, wired, or optical interface. The communication interface 190 may act as a data interface 150.

The computing device 100 may perform such functions in response to processor 120 executing sequences of instructions contained in a computer-readable medium, such as, for example, the memory 130, a magnetic disk, or an optical disk. Such instructions may be read into the memory 130 from another computer-readable medium, such as the data storage 140, or from a separate device via the communication interface 190.

A malicious actor may exploit a vulnerable bus or other data communication medium to steal or corrupt data being sent between a client code set and a data storage. For example, the malicious actor may use a replay attack. A replay attack delays or repeats a valid data transmission to corrupt or steal data. A replay protected storage system may guard against a replay attack by implementing protections at either the storage or at the client side.

Figure 2:
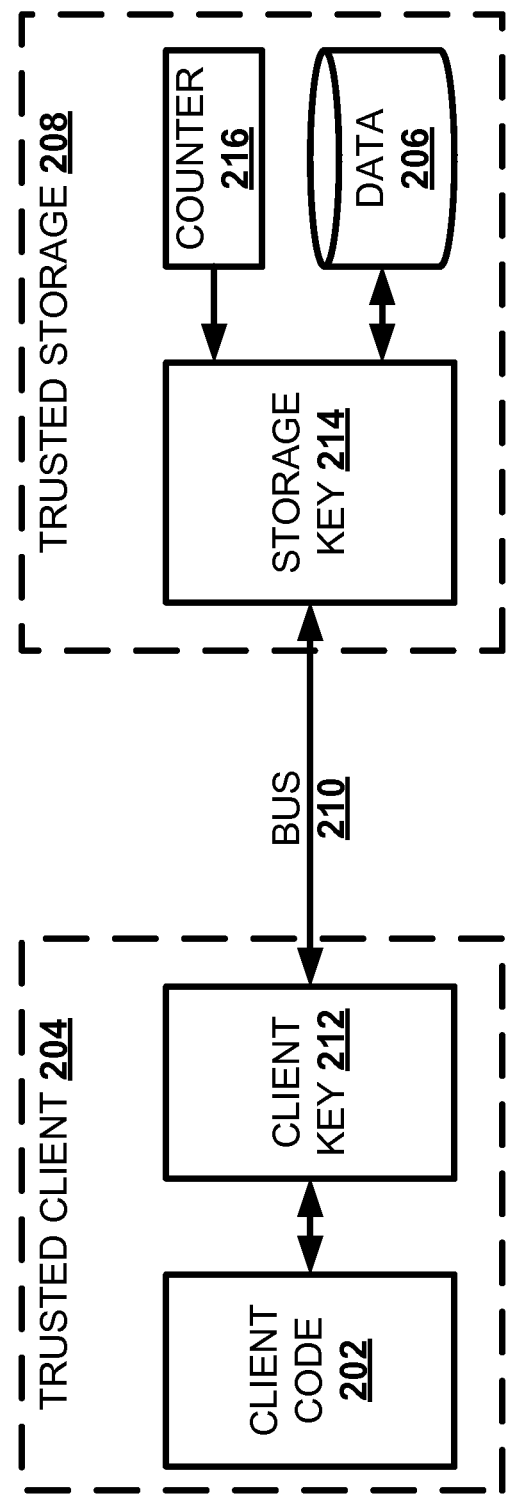
FIG. 2 illustrates, in a block diagram, one embodiment of a storage-oriented replay protected storage system.

FIG. 2 illustrates, in a block diagram, one embodiment of a storage-oriented replay protected storage system 200. The storage-oriented replay protected storage system 200 may implement a client code set 202 within a trusted client environment 204. The trusted client environment 204 may prevent an outside actor from accessing the internal client processes and data. The client code set 202 may store a data set in a data storage 206 maintained within a trusted storage environment 208. The trusted storage environment 208 may prevent an outside actor from accessing the internal storage processes and data.

The client code set 202 may access the trusted storage environment over a bus 210 or other data connection. The bus 210 may be unprotected from outside actors, allowing for a possible man-in-the-middle attack to be inserted at the bus 210. To prevent such an attack, the trusted client environment 204 may protect a client secret symmetric key 212. The client code set 202 may use the client secret symmetric key 212 to create a hash message authentication code signature to associate with any read or write request sent to the trusted storage environment 208. A hash message authentication code applies a hash function to a set of data to create a digital signature. The trusted storage environment 208 may protect a matching storage secret symmetric key 214 to decode the hash message authentication code signature. The data storage 206 may also use the storage secret symmetric key 214 to create a hash message authentication code signature to associate with any read or write response sent to the trusted client environment 204.

The trusted storage environment 208 may have a persistent trusted counter 216 that is incremented upon each successful write to prevent use of a replay attack. The counter value may be public, allowing the client code set 202 to include the counter value in each subsequent write request to the data storage. The data storage 206 may limit acceptance of write requests to authenticated clients, as indicated by a hash message authentication code signature using the client secret symmetric key 212 associated with the write request. The data storage 206 may limit acceptance of read requests to authenticated clients, as indicated by the hash message authentication code signature using the client secret symmetric key 212 associated with the read request. The client code set 202 may limit acceptance of read responses to authenticated data storage devices 206, as indicated by the hash message authentication code signature using the storage secret symmetric key 214 associated with the read response. Both the client code set 202 and the data storage 206 may detect and reject any data which is a replay of previously exchanged data. The client code set 202 may provide a nonce value for each transaction and a counter value for each write request. The data storage 206 may compare the counter value to the persistent trusted counter 216 and accepting the write request upon a match. The data storage 206 may accept the new data block upon a successful write or keep the old data block upon a failed write.

Figure 3:
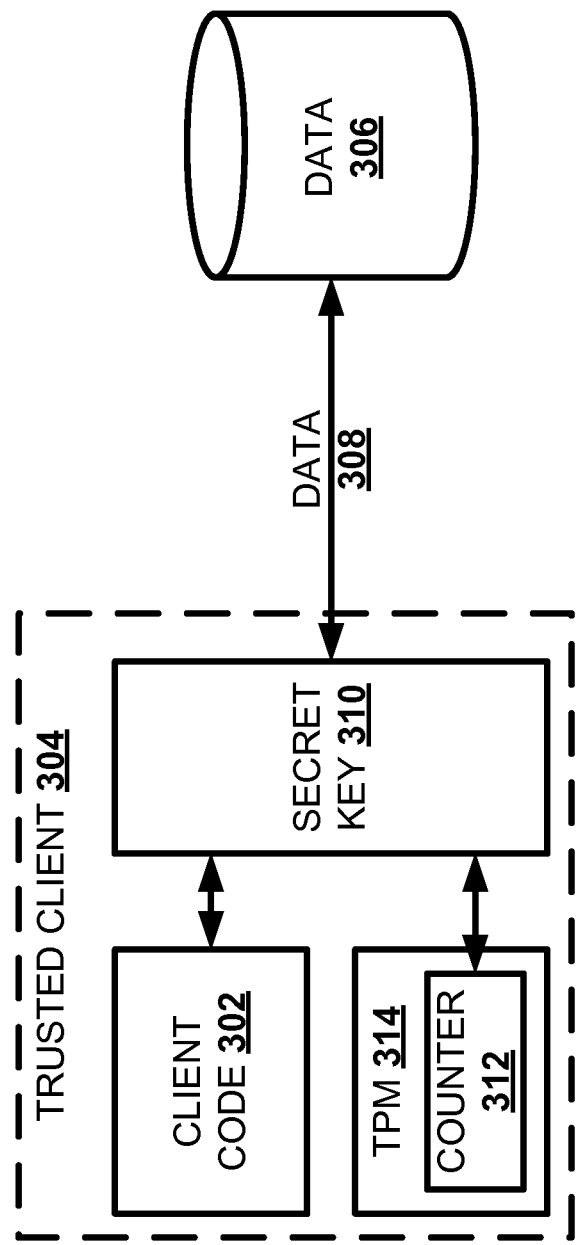
FIG. 3 illustrates, in a block diagram, one embodiment of a virtual replay protected storage system.

Alternately, a replay protected storage system may implement protections at the client side, allowing the data storage to be agnostic as to storage protections. FIG. 3 illustrates, in a block diagram, one embodiment of a virtual replay protected storage system 300. The virtual replay protected storage system 300 may implement a client code set 302 within a trusted client environment 304. The trusted client environment 304 may prevent an outside actor from accessing the internal client processes and data. The client code set 302 may store a data set in an agnostic data storage 306. The agnostic data storage 306 may not have a trusted storage environment, allowing anyone with access to a storage hardware interface to perform any read and write operations. However, the virtual replay protected storage system 300 may use the trusted client environment 304 to achieve a protection level similar to the storage-oriented replay protected storage system.

The client code set 302 may access the agnostic storage device 306 over a bus 308 or other data connection. As with the storage-oriented replay protected storage system, the bus 308 may be unprotected from outside actors. To prevent attacks, the trusted client environment 304 may protect a secret key 310 and a trusted persistent counter 312. The trusted client environment 304 may store the secret key 310 in a read-only memory, such as a one-time-programmable silicon fuse. The trusted persistent counter 312 may track the write requests sent to the agnostic data storage 306. The trusted client environment 304 may further protect the trusted persistent counter 312 in a secure module, such as a trusted platform module 314. The client code set 302 may use the secret key 310 to create a hash message authentication code signature to associate with any read or write request sent to the agnostic storage device 306. The client code set 302 may apply a hash function to any individual data digest with the most recent value of the trusted persistent counter. Thus, the client code set 302 may detect that the data received from the agnostic data storage is the same data the client code set 302 originally wrote. Further, the client code set 302 may detect that the data received is the most recently written data, as opposed to a replay of the stale one.

Figure 4:
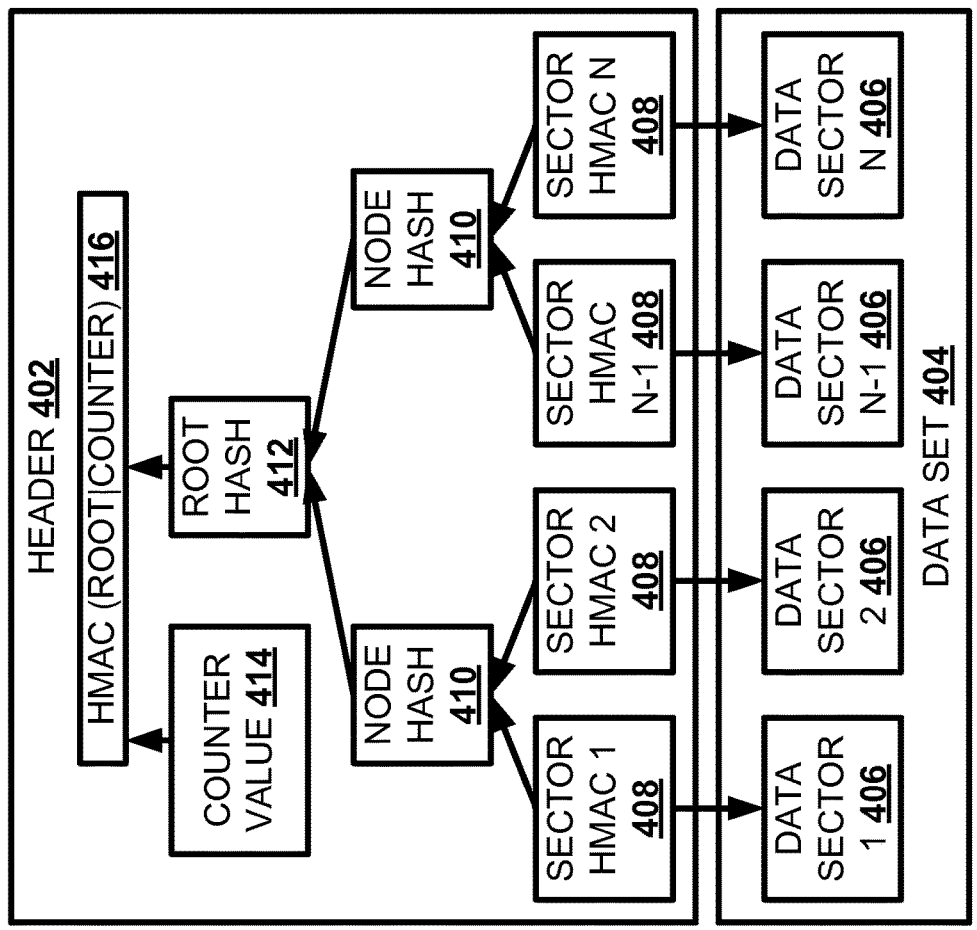
FIG. 4 illustrates, in a block diagram, one embodiment of a simple header architecture.

A client code set may store a data set in an agnostic storage as a set of individual data sectors accompanied by a header structure. FIG. 4 illustrates, in a block diagram, one embodiment of a simple header architecture 400. The agnostic data storage may associate a simple header 402 with a data set 404. The agnostic data storage may divide the data set 404 into one or more data sectors 406. The simple header 402 may contain a sector hash message authentication code (HMAC) signature 408 for each individual data sector 406. The simple header 402 may then hash together the sector hash message authentication code signatures 408 using a hash tree, such as a "Merkle tree". The simple header 402 may hash together two sector hash message authentication code signatures 408 as a node hash value 410. The simple header 402 may hash together multiple node hash values 410 as a root hash value 412. The simple header 402 may combine the root hash value 412 with a present counter value 414 of the trusted counter to create a hash message authentication code signature 416. The simple header 402 may store the hash message authentication code signature 416.

The client code set may use the simple header 402 to initialize the agnostic data storage. The client code set may read the entire simple header from the agnostic data storage. The client code set may re-compute the root hash value 412. The client code set may combine the root hash value 412 with the trusted counter value 414 in the simple header 402 to verify the hash message authentication code signature 416. The client code set may then compare the counter value 414 present in the simple header 402 with the local trusted counter. Any mismatch found during initialization may indicate the data set 404 has been corrupted. If no mismatch is detected, the client code set may cache the simple header 402 locally.

During a sector read, the client code set may read a data sector 406 from the mass storage and verify the hash message authentication code signature 416 found in the simple header 402. A failed verification may indicate the data set 404 has been corrupted. During a sector write, the client code set may write data for one or more data sectors 406 to mass storage. The client code set then may re-compute and update the sector hash message authentication code signature 408 for each of the updated data sectors 406 in the simple header 402. The client code set may then re-compute the root hash value 412. The client code set may increment a local trusted counter value. The client code set may re-compute the hash message authentication code signature 416. The client code set may write the entire simple header 402 to the mass storage device. Any failure during this stage may result in the underlying data structure becoming corrupt and unusable.

Figure 5:
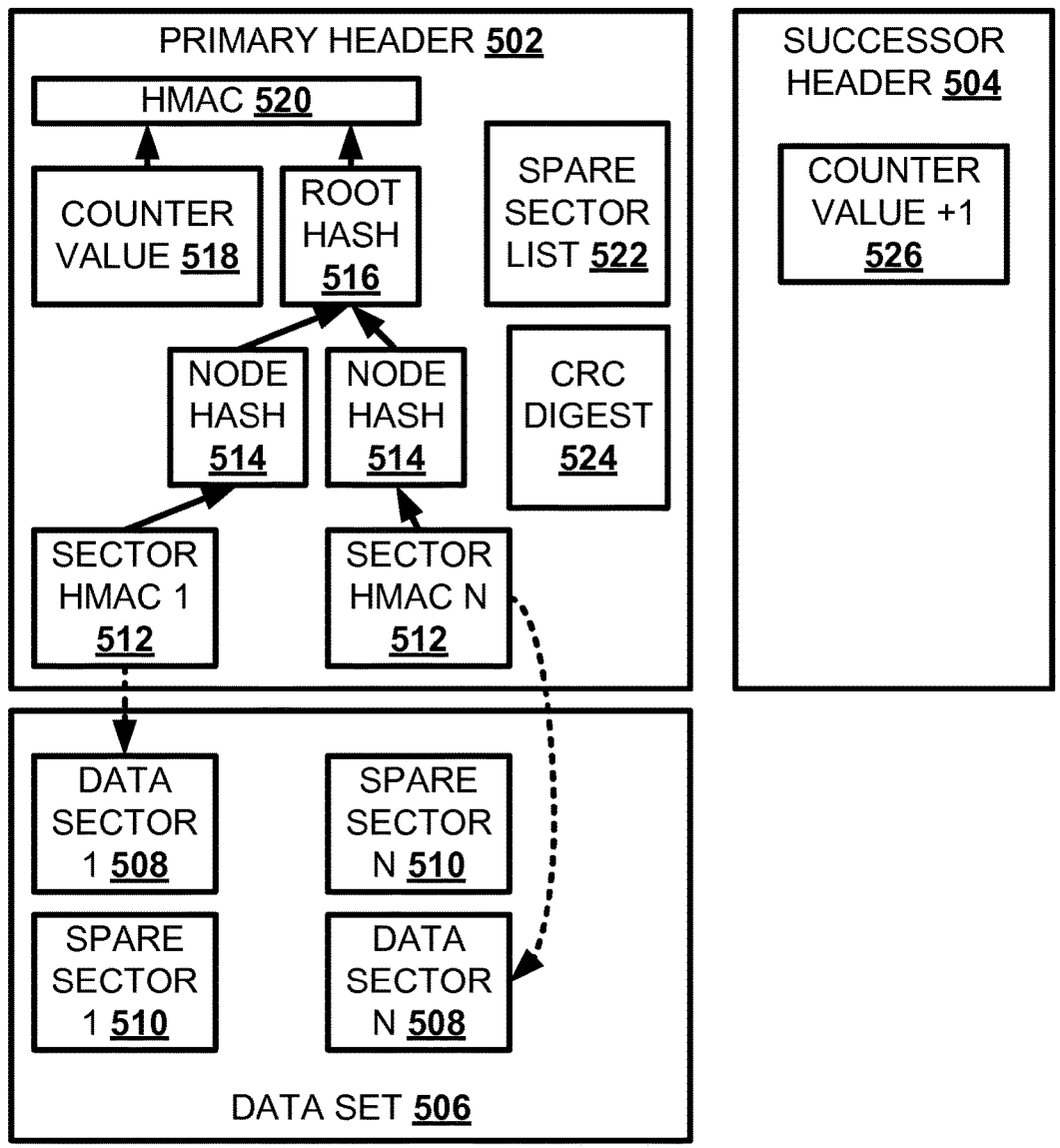
FIG. 5 illustrates, in a block diagram, one embodiment of a fault-tolerant header architecture.

The client code set may use a modified header to become fault-tolerant and support write atomicity. FIG. 5 illustrates, in a block diagram, one embodiment of a fault-tolerant header architecture 500. The agnostic data storage may associate a primary header instance 502 and a successor header instance 504 with a data set 506. The agnostic data storage may divide the data set 506 into one or more data sectors 508. The agnostic data storage may allocate one or more spare sectors 510 in the data region of the data set 506. The number of spare sectors 510 may equal the maximum number of data sectors 508 the client code set may expect to update as part of a single atomic operation.

The primary header instance 502 may contain a sector hash message authentication code (HMAC) signature 512 for each individual data sector 508. The primary header instance 502 may introduce a level of indirection between a logical sector number and a physical sector address. The data structure for the sector hash message authentication code signature 512 may be addressed based on the logical sector number and the physical sector address. The agnostic data storage may have further layers of sector address translation that render the physical sector address as more of a virtual physical sector address.

The primary header instance 502 may then hash together two sector hash message authentication code signatures 512 as a node hash value 514. The primary header instance 502 may hash together multiple node hash values 514 as a root hash value 516. The primary header instance 502 may combine the root hash value 516 with a present counter value 518 of the trusted counter to create a hash message authentication code signature 520. The primary header instance 502 may store the hash message authentication code signature 520. The primary header instance 502 may store a spare sector list 522, of fixed or variable length, describing the physical addresses of the spare sectors 510. The primary header instance 502 may store a 32-bit cyclic redundancy check (CRC) digest 524 for the data set 506. A 32-bit cyclic redundancy check digest 524 is a value based on a common error-detecting code that indicates whether the data set 506 has been changed.

The primary header instance 502 may describe the data set 506 prior to a write operation. The successor header instance 502 may describe the data set 506 after a write operation. The successor header instance 502 may store an incremented counter value 526 one greater than the present counter value 518 of the primary header instance 502, indicating that a write operation has occurred.

The client code set may initialize the agnostic data storage in a fault-tolerant manner. The client code set may read the primary header instance 502 and the successor header instance 504 from the agnostic data storage. The client code set may verify the cyclic redundancy check digest 524 for the primary header instance 502 and the successor header instance 504. The client code set may discard any header instance which fails the cyclic redundancy check. The client code may compare the counter value 518 for the primary header instance 502 and the incremented counter value 526 in the successor header instance 504 with the local trusted counter value. The client code set may discard the header instance that does not have a counter value matching the local trusted counter value. The client code set may verify the hash message authentication code signature 520 of the remaining header. If the hash message authentication code signature 520 passes verification, the client code set may cache the remaining header locally. If the primary header instance 502 and the successor header instance 504 both pass the cyclic redundancy check, the present counter value 518 matches the local trusted counter value, and the incremented counter value 526 matches the local trusted counter value plus one, the client code set may select either the primary header instance 502 or the successor header instance 504. The primary header instance 502 may provide a consistent view of the data set 508 prior to the recent attempted update. The successor header instance 504 may provide a consistent view of the data set 508 after the recent attempted update. If the client code set selects the successor header instance 504, the client code set may increment the trusted local counter.

During a sector read, the client code set may determine the physical sector address by locating the sector hash message authentication code signature 512 corresponding to the requested logical address. The client code set may use the information contained within the sector hash message authentication code signature 512 to obtain the physical sector address. The client code set may read the content from the data sector 508 from the agnostic data storage. The client code set may verify the sector hash message authentication code signature 512 found in the primary header instance 502. A failed verification may indicate the data set 506 has been corrupted.

During a sector write, the client code set may use the spare sector list 522 to pick one or more spare sectors for the write operation. The client code set may write the data to the chosen spare sector 510. The client code set may then compute the sector hash message authentication code signature 512 and update the sector hash message authentication code signature 512 corresponding to a logical address of the data sector 508 being updated with the physical address of the spare sector 510 populated with new data. The client code set may update the spare sector list 522 with the physical addresses of the data sectors identified by the updated sector hash message authentication code signature 512. The client code set may re-compute the root hash value 516 and re-calculate the hash message authentication code signature 520 using the local trusted counter value incremented by one. The client code set may postpone incrementing the actual trusted counter value. The client code set may update the cyclic redundancy check digest 524. The client code set may write the header instance to the agnostic data storage using the spare header location, or the unselected header instance location. Upon a successful write operation, the client code set may increment the local trusted counter by one.

Thus, if the write operation was successfully completed, the header structure on the agnostic data storage matches the trusted counter value and points to the updated data sectors. If the write operation failed but the original data has been preserved, the new header instance on the agnostic data storage may not match the local counter value during the next initialization, leading to the other header instance being used. The other header instance may have a consistent view of the data prior to the write operation. If the updated header instance fails to persist, the counter value may not match the local counter value during the next initialization. If the updated header instance is corrupted, the client code set may detect the corruption in the cyclic redundancy check and discard the update.

Figure 6:
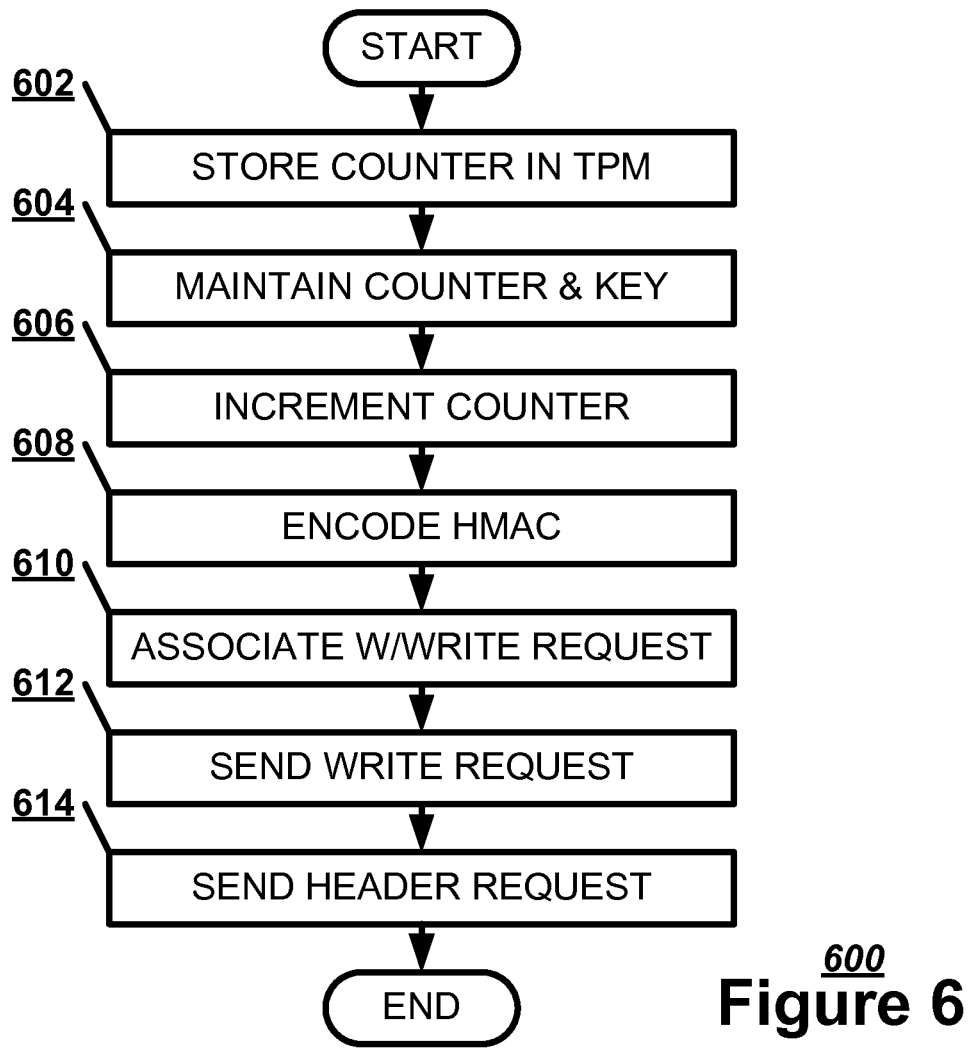
FIG. 6 illustrates, in a flowchart, one embodiment of a method for a simple write action by a client code set.

FIG. 6 illustrates, in a flowchart, one embodiment of a method 600 for a simple write action by a client code set. The client code set may store a trusted counter a trusted platform module (Block 602). The client code set may maintain a trusted counter and a secret key in a trusted client environment (Block 604). The client code set may increment a trusted counter (Block 606). The client code set may encode a hash message authentication code signature based on the trusted counter, the secret key, and a data set (Block 608). The client code set may associate the hash message authentication code signature with a write request, possibly as part of a simple header for the data set included with the write request or sent as a separate header write request (Block 610). The client code set may send a write request of the data set associated with the hash message authentication code signature to an agnostic data storage (Block 612). The client code set may send a header write request of the data set to an agnostic data storage to write a simple header having the hash message authentication code signature (Block 614).

Figure 7:
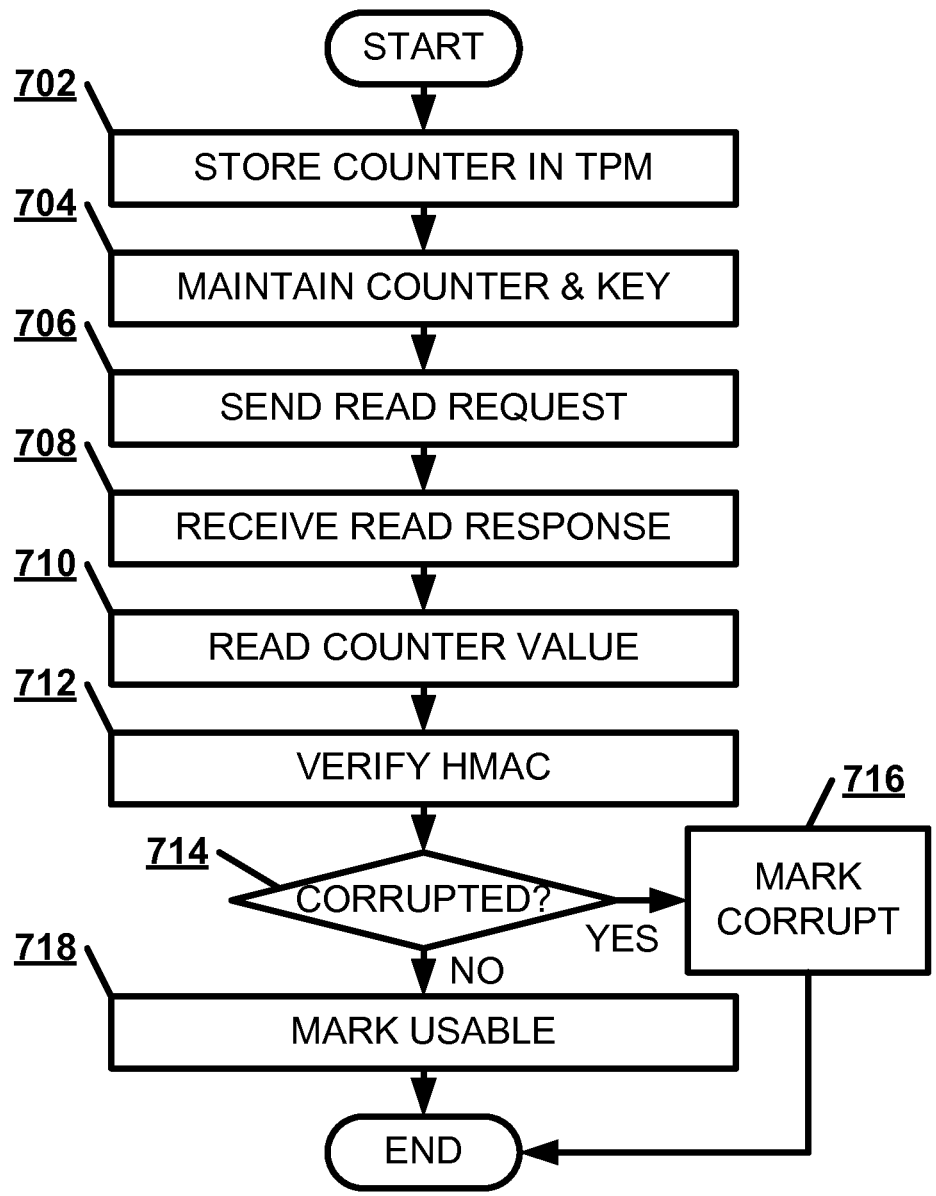
FIG. 7 illustrates, in a flowchart, one embodiment of a method for a read action by a client code set.

FIG. 7 illustrates, in a flowchart, one embodiment of a method 700 for a read action by a client code set. The client code set may store a trusted counter a trusted platform module (Block 702). The client code set may maintain a trusted counter and a secret key in a trusted client environment (Block 704). The client code set may send a read request for a data set associated with a hash message authentication code signature based on the trusted counter, the secret key, and a data set to an agnostic data storage (Block 706). The client code set may receive a read response having the data set and associated header conveying the hash message authentication code signature from the agnostic data storage (Block 708). The client code set may read a counter value from the trusted counter (Block 710). The client code set may verify the hash message authentication code signature to determine whether the data set has been corrupted (Block 712). If the verification indicates the data has been corrupted (Block 714), the client code set may mark the data set as corrupt (Block 716). If the verification indicates the data has not been corrupted (Block 714), the client code set may mark the data set as usable (Block 718).

Figure 8:
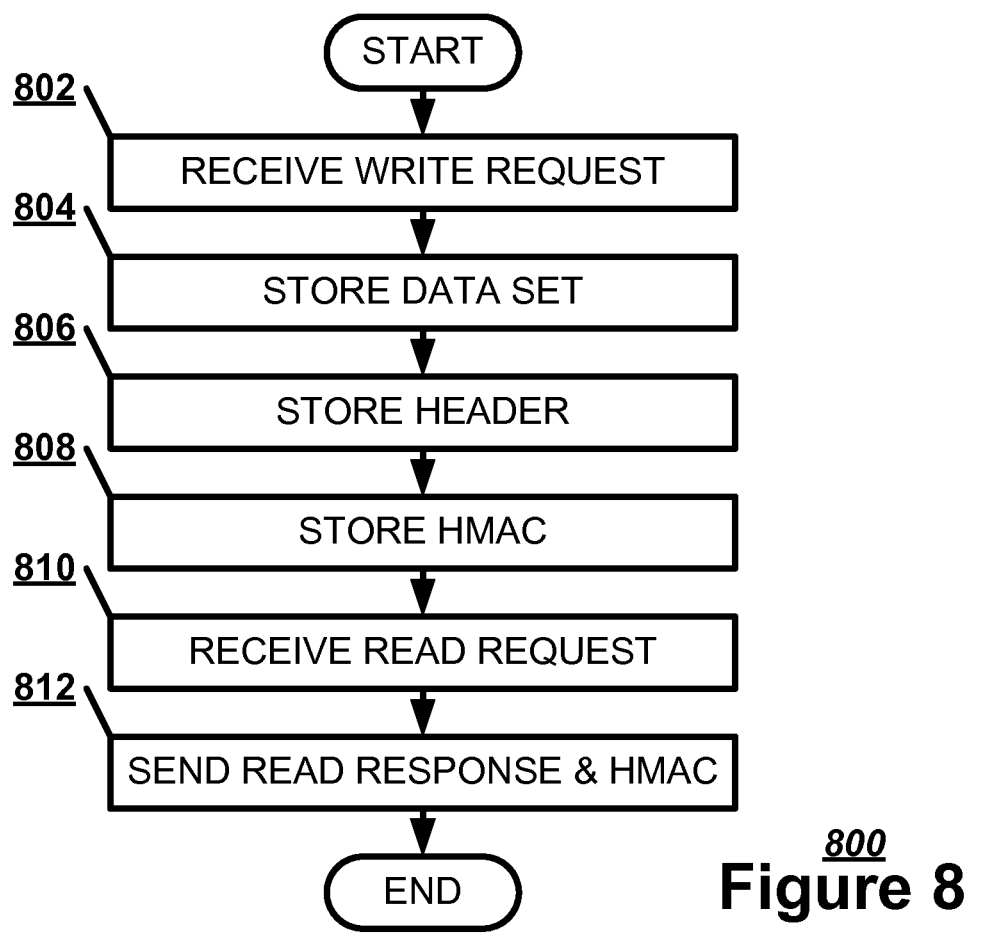
FIG. 8 illustrates, in a flowchart, one embodiment of a method for a simple storage action by an agnostic data storage.

FIG. 8 illustrates, in a flowchart, one embodiment of a method 800 for a simple storage action by an agnostic data storage. The agnostic data storage may receive a write request from the client code set (Block 802). The agnostic data storage may store a data set sent in the write request from the client code set (Block 804). The agnostic data storage may store a header instance describing the data set, possibly sent as a separate request (Block 806). The agnostic data storage may store a hash message authentication code signature sent in the write request, possibly in the header instance (Block 808). The agnostic data storage may receive a read request from the client code set (Block 810). The agnostic data storage may send a read response having the data set and the hash message authentication code signature to the client code set (Block 812).

Figure 9:
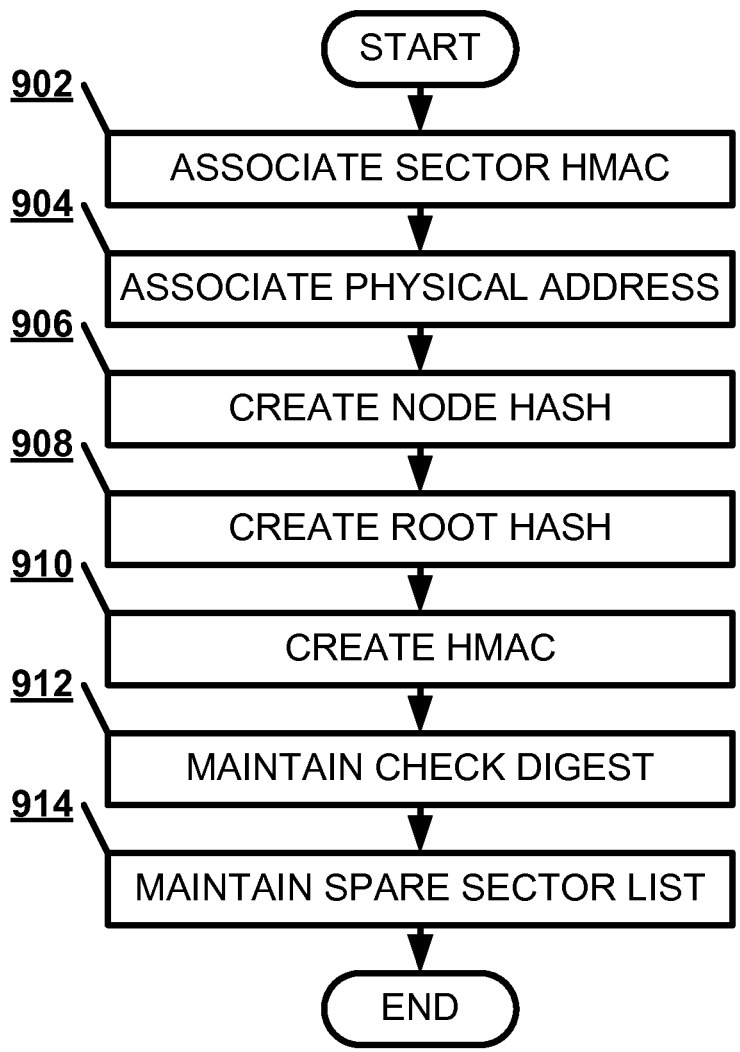
FIG. 9 illustrates, in a flowchart, one embodiment of a method for header construction by a client code set.

FIG. 9 illustrates, in a flowchart, one embodiment of a method 900 for header construction by a client code set. The client code set may associate a sector hash message authentication code signature with a data sector of the data set in a primary header instance (Block 902). The client code set may associate a physical sector address with a sector hash message authentication code signature of a data sector of the data set (Block 904). The client code set may create a node hash in the primary header instance of the data set based on the sector hash message authentication code signature of a data sector of the data set (Block 906). The client code set may create a root hash in the primary header instance of the data set based on the node hash, and by extension the sector hash message authentication code signature of a data sector of the data set (Block 908). The client code set may create the hash message authentication code signature in the primary header instance from a root hash of the data set and a counter value of the trusted counter (Block 910). The client code set may maintain a check digest for the data set in a primary header instance (Block 912). The client code set may maintain a spare sector list describing a spare sector in a primary header instance (Block 914).

Figure 10:
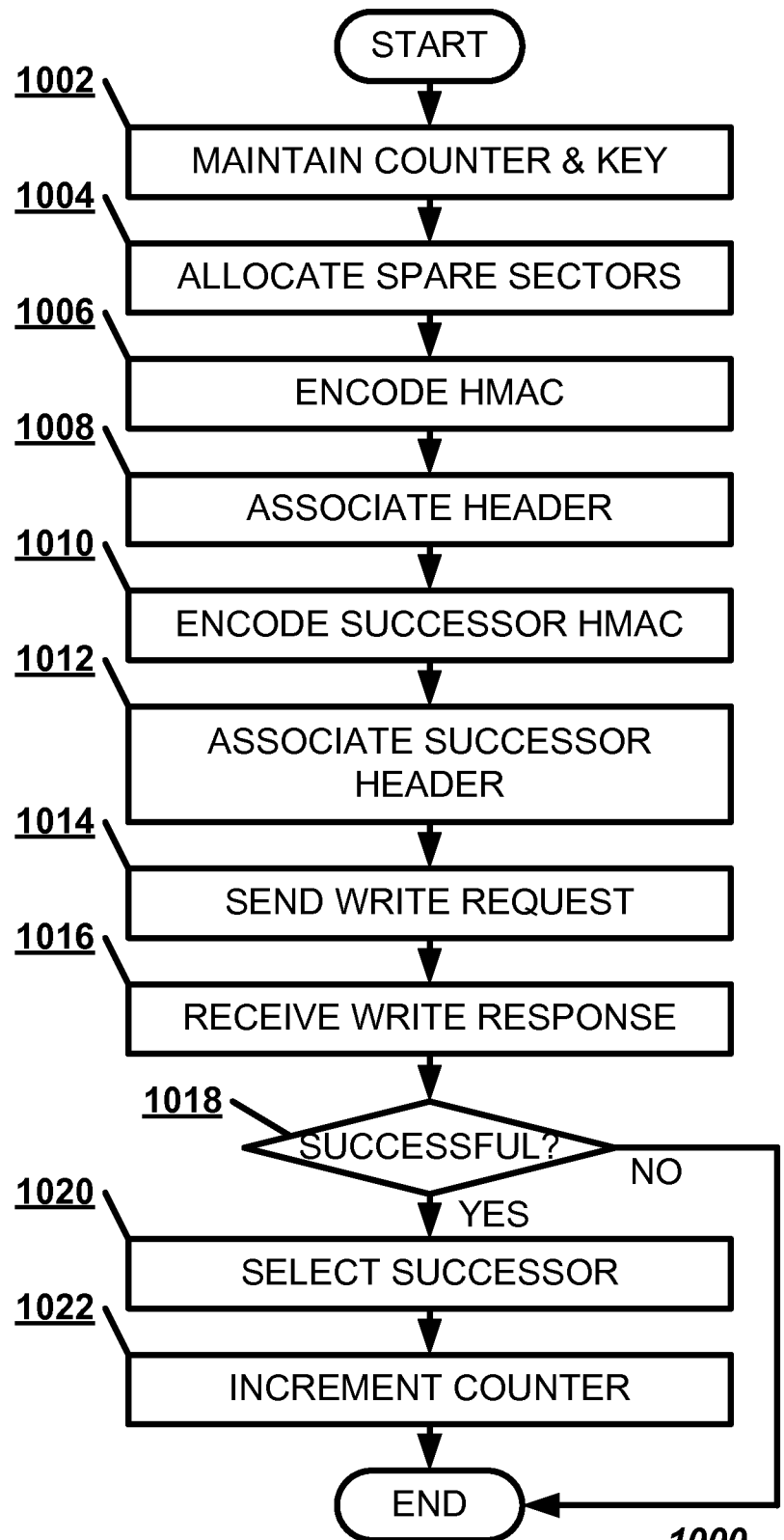
FIG. 10 illustrates, in a flowchart, one embodiment of a method for a fault-tolerant write action by a client code set.

FIG. 10 illustrates, in a flowchart, one embodiment of a method 1000 for a fault-tolerant write action by a client code set. The client code set may maintain a trusted counter and a secret key in a trusted client environment (Block 1002). The client code set may allocate a spare sector for a data sector of the data set (Block 1004). The client code set may encode a primary hash message authentication code signature based on a counter value of the trusted counter, the secret key, and a data set (Block 1006). The client code set may associate a primary header instance with the data set having a primary hash message authentication code signature based on a counter value of the trusted counter (Block 1008). The client code set may encode a successor hash message authentication code signature based on a counter value of the trusted counter, the secret key, and a data set (Block 1010). The client code set may associate a successor header instance with the data set having a successor hash message authentication code signature based on an incremented counter value of the trusted counter (Block 1012). The client code set may send a write request of the data set with the primary header instance and the successor header instance to an agnostic data storage (Block 1014). The client code set may receive a write response (Block 1016). If the write response confirms the write operation was successful (Block 1018), the client code set may select the successor header instance for the data set (Block 1020). The client code set may increment the trusted counter upon selecting the successor header instance for the data set (Block 1022).

Figure 11:
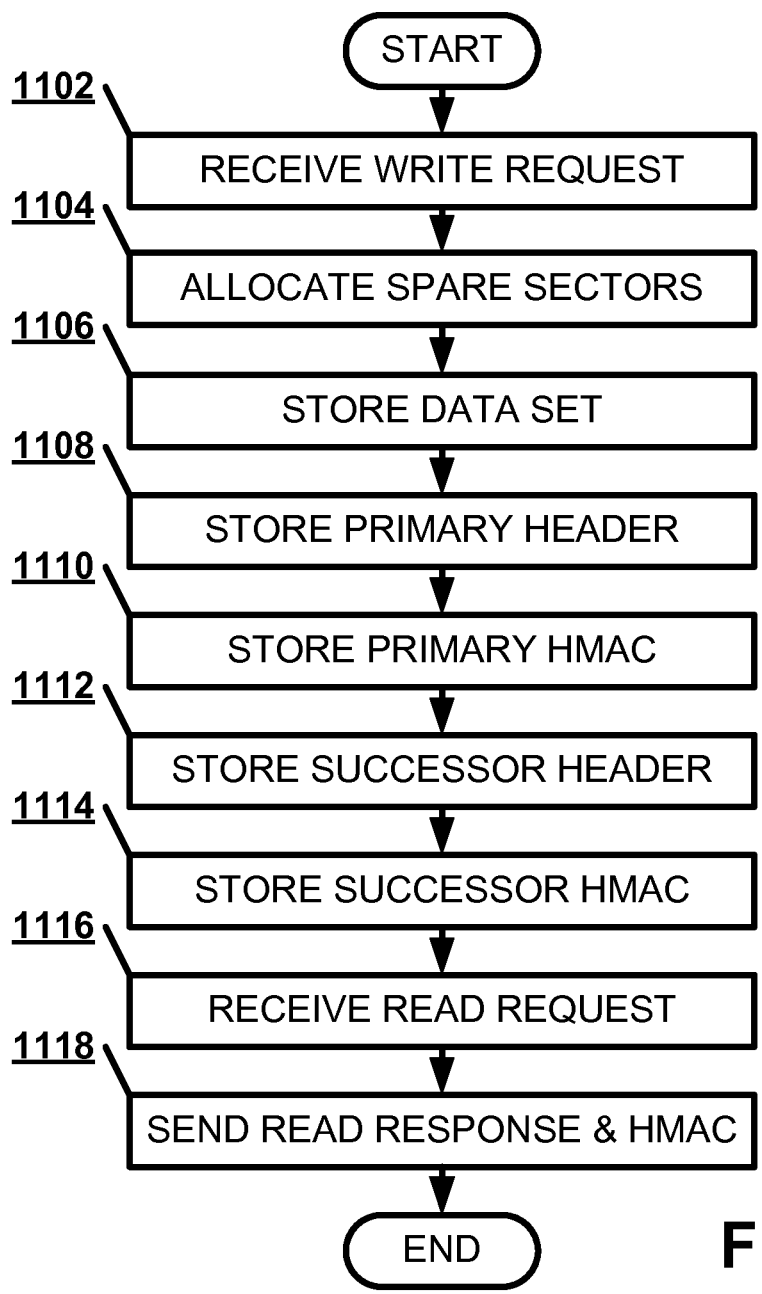
FIG. 11 illustrates, in a flowchart, one embodiment of a method for a fault-tolerant storage action by an agnostic data storage.

FIG. 11 illustrates, in a flowchart, one embodiment of a method 1100 for a fault-tolerant storage action by an agnostic data storage. The agnostic data storage may receive a write request from the client code set (Block 1102). The agnostic data storage may allocate a spare sector for a data sector of the data set (Block 1104). The agnostic data storage may store a data set sent in the write request from the client code set (Block 1106). The agnostic data storage may store a primary header instance describing the data set (Block 1108). The agnostic data storage may store a primary hash message authentication code signature sent in the write request, possibly in the primary header instance (Block 1110). The agnostic data storage may store a successor header instance describing the data set (Block 1112). The agnostic data storage may store a successor hash message authentication code signature sent in the write request, possibly in the successor header instance (Block 1114). The agnostic data storage may receive a read request from the client code set (Block 1116). The agnostic data storage may send a read response having the data set, the primary header instance, and the successor header instance to the client code set (Block 1118).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to store desired program code means in the form of computer-executable instructions or data structures, as opposed to propagating media such as a signal or carrier wave. Computer-readable storage media explicitly does not refer to such propagating media. Combinations of the above should also be included within the scope of the computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A virtual replay protected storage system, comprising:
   a trusted counter maintained in a trusted client environment;
   a processing core having at least one hardware processor configured to encode a hash message authentication code signature based on the trusted counter, a secret key stored in the trusted client environment, and a data set; and
   a data interface configured to send a write request of the data set associated with the hash message authentication code signature to an agnostic data storage and receive a write response indicating whether the write request is successful, wherein the agnostic data storage operates in an untrusted environment and stores the data set without complying with a replay protected storage protocol,
   wherein the data interface is further configured to send a read request of the data set associated with the hash message authentication code signature to the agnostic data storage, and
   wherein the processing core is further configured to verify the hash message authentication code signature, as received from the agnostic data storage along with the data set in response to the read request, to determine whether the data set has been corrupted.

2. The virtual replay protected storage system of claim 1, further comprising:
   a trusted platform module configured to act as the trusted client environment.

3. The virtual replay protected storage system of claim 1, further comprising:
   memory configured to associate a sector hash message authentication code signature with a data sector of the data set in a primary header instance.

4. The virtual replay protected storage system of claim 1, further comprising:
   memory configured to associate a physical sector address with a sector hash message authentication code signature of a data sector of the data set.

5. The virtual replay protected storage system of claim 1, wherein the processing core is further configured to create a root hash in a primary header instance of the data set based on hashing a sector hash message authentication code signature of a data sector of the data set together with a different sector hash message authentication code signature of a different data sector of the data set.

6. The virtual replay protected storage system of claim 1, wherein the processing core is further configured to create the hash message authentication code signature from a root hash of a data sector of the data set and the trusted counter.

7. The virtual replay protected storage system of claim 1, further comprising:
   memory configured to maintain a check digest for the data set in a primary header instance.

8. The virtual replay protected storage system of claim 1, further comprising:
   memory configured to maintain a spare sector list describing a spare sector in a primary header instance.

9. The virtual replay protected storage system of claim 1, wherein the processing core is further configured to allocate a spare sector in the agnostic data storage for a data sector of the data set.

10. The virtual replay protected storage system of claim 1, further comprising:
    memory configured to associate a successor header instance with the data set having a successor hash message authentication code signature based on an incremented trusted counter value.

11. The virtual replay protected storage system of claim 1, wherein the trusted counter is configured to increment upon selection of a successor header instance for the data set.

12. A machine-implemented method, comprising:
    maintaining a trusted counter and a secret key in a trusted client environment;
    encoding a hash message authentication code signature based on the trusted counter, the secret key, and a data set;
    sending a write request of the data set associated with the hash message authentication code signature to an agnostic data storage, wherein the agnostic data storage operates in an untrusted environment and stores the data set without complying with a replay protected storage protocol;
    receiving a write response indicating whether the write request is successful;
    sending a read request for the data set associated with the hash message authentication code signature to the agnostic data storage; and
    verifying the hash message authentication code signature, as received from the agnostic data storage along with the data set in response to the read request, to determine whether the data set has been corrupted.

13. The method of claim 12, further comprising:
    associating a successor header instance with the data set having a successor hash message authentication code signature based on an incremented counter value of the trusted counter; and
    incrementing the trusted counter upon selecting the successor header instance for the data set.

* * * * *